US012542274B2

(12) United States Patent
de Savio Silva et al.

(10) Patent No.: US 12,542,274 B2
(45) Date of Patent: Feb. 3, 2026

(54) LITHIUM-ION BATTERY ANODE MATERIAL BASED ON SPHERICAL NATURAL GRAPHITE CONTAINING SILICATES

(71) Applicant: Syrah Resources Limited, Melbourne (AU)

(72) Inventors: Camila de Savio Silva, North Melbourne (AU); Peter Ian Barnes, Cottesloe (AU); Jens Berkan, Munich (DE); Joseph Russell Williams, Dubai (AE); Richard V. Chamberlain, II, Fairfax Station, VA (US); Jay Jie Shi, Acton, MA (US); Tord Per Jens Onnerud, Wilton, CT (US); Maria Christina Lampe-Onnerud, Wilton, CT (US)

(73) Assignee: Syrah Resources Limited, Melbourne (AU)

( * ) Notice: Subject to any disclaimer, the term of this patent is extended or adjusted under 35 U.S.C. 154(b) by 307 days.

(21) Appl. No.: 16/999,531

(22) Filed: Aug. 21, 2020

(65) Prior Publication Data

US 2021/0057734 A1    Feb. 25, 2021

Related U.S. Application Data

(60) Provisional application No. 62/889,816, filed on Aug. 21, 2019.

(51) Int. Cl.
*H01M 4/36* (2006.01)
*H01M 4/38* (2006.01)
(Continued)

(52) U.S. Cl.
CPC ........... *H01M 4/366* (2013.01); *H01M 4/386* (2013.01); *H01M 4/587* (2013.01);
(Continued)

(58) Field of Classification Search
None
See application file for complete search history.

(56) References Cited

U.S. PATENT DOCUMENTS 5,624,606 A    4/1997  Wilson et al.
5,908,715 A    6/1999  Liu et al.
(Continued)

FOREIGN PATENT DOCUMENTS

CN    1585172 A    2/2005
CN    1702894 A    11/2005
(Continued)

OTHER PUBLICATIONS

Lingfeng Zhao, "Purification of engineered graphite for advanced application", Degree project in Materials Science and Engineering, 2022, Stockholm, Sweden. (Year: 2022).*
(Continued)

*Primary Examiner* — Zhongqing Wei
(74) *Attorney, Agent, or Firm* — McCarter & English, LLP

(57) ABSTRACT

Materials and novel methods for producing carbon anodes for Li-ion batteries are described. These materials use natural flake graphite that has been processed to improve physical properties but retains residual impurities including silicates and other silicon containing minerals that are difficult to eliminate economically. For the purposes of battery anode material production, further purification is required and traditionally uses hydrofluoric acid, adding significant cost and environmental management requirements. Alternate novel processes result in less costly and more environmentally friendly methods when compared against the standard acid purification with hydrofluoric acid. Methods for direct graphitization of unpurified spheroidized graphite material that includes a carbonaceous coating in production of a lithium ion battery anode are provided. Materials generated (Continued)

using these methods may be blended with artificial graphite and particulate Silicon or $SiO_x$ materials for enhanced properties.

9 Claims, 4 Drawing Sheets

(51) Int. Cl.
*H01M 4/587* (2010.01)
*H01M 10/0525* (2010.01)
*H01M 4/02* (2006.01)

(52) U.S. Cl.
CPC .. *H01M 10/0525* (2013.01); *H01M 2004/021* (2013.01); *H01M 2004/027* (2013.01)

(56) References Cited

U.S. PATENT DOCUMENTS

| | | | |
|---|---|---|---|
| 6,403,259 | B1 | 6/2002 | Kitagawa et al. |
| 8,038,977 | B2 | 10/2011 | Yamamoto et al. |
| 9,614,216 | B2 | 4/2017 | Kouzu et al. |
| 2002/0061445 | A1* | 5/2002 | Kitagawa ............ H01M 4/0471 429/223 |
| 2009/0196816 | A1 | 8/2009 | Yamamoto et al. |
| 2015/0259589 | A1* | 9/2015 | Takagi ................ C09D 201/00 252/75 |

FOREIGN PATENT DOCUMENTS

| | | |
|---|---|---|
| CN | 1923681 A | 3/2007 |
| CN | 102394287 A | 3/2012 |
| CN | 102485648 A | 6/2012 |
| CN | 103022435 | 4/2013 |
| JP | 2000/203818 A | 7/2000 |
| JP | 2004/179015 | 6/2004 |
| JP | 2004210634 A | 7/2004 |
| JP | 2005149946 | 6/2005 |
| JP | 2007/141677 A | 6/2007 |
| JP | 2008542981 A | 11/2008 |

OTHER PUBLICATIONS

PCT International Search Report and Written Opinion dated Nov. 19, 2020 for PCT/IB2020/047381.

Search Report from related European Patent Application No. 20853920.5 issued Sep. 4, 2023.

Park et al., "Modification for Improving the Electrochemical Performance of Spherically-Shaped Natural Graphite as Anode Material for Lithium-Ion Batteries ", Journal of The Electrochemical Society, 163 (14) A3078-A3086 (2016).

Japanese and English Translation of Notification of Reasons for Refusal from related Japanese Patent Application No. 2022-511261 issued Jun. 25, 2024.

* cited by examiner

LITHIUM-ION BATTERY ANODE MATERIAL BASED ON SPHERICAL NATURAL GRAPHITE CONTAINING SILICATES

CROSS-REFERENCE TO RELATED APPLICATION

The present application claims priority benefit to a provisional application entitled "Lithium-Ion Battery Anode Material based on Spherical Natural Graphite Containing Silicates," which was filed on Aug. 21, 2019, and assigned Ser. No. 62/889,816. The entire content of the foregoing provisional application is incorporated herein by reference.

BACKGROUND

Technical Field

The present disclosure is directed to methods for processing natural graphite that may be advantageously employed to produce, inter alia, carbon anodes for Li-ion batteries. The present disclosure is also directed to processed natural graphite materials with particular utility in carbon anode production for Li-ion batteries.

In exemplary embodiments of the present disclosure, methods for direct graphitization of spheroidized graphite material that includes a carbonaceous coating in production of a lithium ion battery anode are provided. The disclosed direct graphitization methods may be entirely temperature-based, i.e., may eliminate a chemical purification step in toto, or may include a chemical purification step that excludes hydrofluoric (HF) acid treatment, to generate a material suitable for lithium ion battery anode production.

In further exemplary embodiments of the present disclosure, natural graphite is processed to improve grade but to retain residual silicon-based impurities, including silicates and other silicon-containing minerals that are difficult to eliminate economically. Processed materials generated using the disclosed methods may be blended with artificial graphite and/or particulate silicon and/or silicon oxide ($SiO_x$) materials for enhanced properties.

Background Art

Natural graphite has traditionally been used as an anode material for Li-ion batteries due to its ability to intercalate lithium. Natural graphite is popular for its low cost compared to artificially produced graphite, such as graphite produced from calcined cokes. Natural graphite ore is currently mined from both open pit and underground operations. The graphite-containing ore is processed by a sequence of mechanical treatments designed to liberate the graphite mineral from the host rock and refine the select mineral into a highly concentrated bulk product through crushing, milling, screening, flotation and drying.

Natural graphite mineral concentrates derived from these processes yield a range of flake products, which are generally differentiated based on size and purity. Subsequent classification separates the concentrate into targeted flake size distribution categories for specific applications. Physical concentration processes, such as flotation, can typically achieve purity levels of up to approximately 94%-98% total carbon (TC) content.

Impurities in the concentrate comprise naturally occurring minerals consistent with the graphitic host rock, otherwise known as gangue minerals. The gangue minerals are typically liberated from the graphite within the concentrate, but may also be attached to or embedded within the graphite flakes. A large proportion of gangue minerals in graphite concentrates are silicates or other silicon-containing minerals, including quartz, feldspar and phyllosilicates. Gangue materials also contain significant quantities of aluminum and iron as oxides, as well as other compounds that are undesirable/deleterious in anodes for lithium ion battery application.

More generally, foreign uncontrolled compounds within a lithium ion battery present a high risk to cause side reactions that reduce battery performance and reliability. As a consequence of natural processes and formation, impurities may or may not be homogeneous, representing a control risk that can be mitigated through purification of the carbon material, e.g., graphite, to the highest levels economically feasible. To manage impurities, the battery anode material industry has established chemical and thermal purification processes to remove impurities and reach very low levels of ash content (>99.9% TC, preferably >99.98% TC).

For application in lithium ion batteries, natural graphite concentrate must undergo various additional stages of processing to meet stringent requirements adopted by the industry. Specifically, the flake graphite undergoes processing to achieve very specific physical and chemical characteristics regarding size, density, morphology, high purity and surface treatment. The noted processing typically involves mechanically pulverizing and shaping the graphite particles, via a process called spheroidization, followed by a purification process, generally a chemical purification process. Smaller flake size distributions of natural graphite, typically ranging 60 μm-150 μm (d50), are used as feed material for the production of lithium ion battery anode active material precursors. Additional size reduction of the graphite through milling is generally necessary to meet specific powder morphology requirements for end use.

For thermal purification (i.e., non-chemical purification), the heat treatment must occur at temperatures high enough to evaporate/sublime the impurities. In particular, the removal of silicate-based minerals requires extremely high temperatures in the range equivalent to graphitization temperatures applied in the production of artificial graphite. This process may be hazardous and is energy/time consuming, and is, therefore, costly. Thermal purification also requires a furnace system capable of removing and managing the gas released from the graphite particles during the various stages of heat treatment.

In turn, chemical purification can be undertaken through both alkaline and acid treatments that leach out the residual minerals from the graphite. Acid treatment is more commonly used and typically relies on a mix of hydrochloric (HCl), sulfuric ($H_2SO_4$), and hydrofluoric (HF) acids. After the chemical purification process, the product is washed to remove residual acid and salts.

Following chemical or thermal purification, the graphite typically contains >99.90% carbon.

The mineralization that is most difficult to remove is generally based on the element silicon, and this impurity is most prominent in silicate form. In thermal purification, the challenge is largely due to the presence of silicon carbide, which is formed as a by-product of silicon oxide decomposition and consequent reaction of silicon with carbon. Silicon carbide is a stable chemical compound that does not sublime at temperatures below 2600° C. to 2800° C. Chemical purification processes preferably employ hydrofluoric acid due to its efficient dissolution of silicon-containing minerals from the graphite. Unfortunately, chemical purification processes that employ HF are associated with environmental, health and safety concerns, raising environmental management requirements.

Despite efforts to date, a need remains for materials/methods that allow highly efficacious carbon anode material to be derived from natural graphite in a cost effective, safe and efficient manner. These and other beneficial objectives are achieved according to the materials and methods disclosed herein.

SUMMARY

The present disclosure provides advantageous methods for processing natural graphite that may be employed to produce, inter alia, carbon anodes for Li-ion batteries. The present disclosure further provides processed natural graphite materials with particular utility in carbon anode production for Li-ion batteries. The natural graphite may be processed to improve grade or to retain residual silicon-based impurities, including silicates and other silicon-containing minerals that are difficult to eliminate economically. The processed materials may be spheroidized or unspheroidized. The processed materials may be coated with carbonaceous material (e.g., pitch) and subject to a temperature-based treatment that achieves either a carbonized or graphitized surface layer. Such process including temperature treatment may purify the graphite particle to >99.95 weight % carbon. The processed materials that are generated using the disclosed methods may be blended with artificial graphite and/or particulate silicon and/or $SiO_x$ materials for enhanced properties.

According to the present disclosure, processing methods are disclosed whereby spheroidized natural graphite and a carbonaceous material (e.g., pitch) are subject to a temperature-based treatment alone, i.e., without acid treatment, to achieve cost effective and environmentally friendly direct graphitization of the carbonaceous material as a coating and to purify the core graphite particles. In alternative implementations, a chemical treatment of the graphite may be undertaken prior to combination of the graphite/carbonaceous material in connection with the noted temperature-based treatment. However, according to the present disclosure, the chemical treatment associated with this alternative implementation does not include treatment of the graphite with HF, thereby eliminating the most expensive and potentially hazardous form of chemical treatment associated with conventional operations. The treatment temperatures for the disclosed graphitization of the graphite/carbonaceous material may be below temperatures heretofore thought feasible for graphitization of the carbonaceous material. The lower temperatures are enabled based on a recognition that silicon-based impurities need not be removed to yield graphite-based precursor material that may be effectively employed in anode production for a lithium ion battery.

The disclosed methods for graphite treatment, and the processed graphite materials produced according to the present disclosure, offer significant benefits. For example, the disclosed methods are less costly and more environmentally friendly when compared with conventional acid purification methods (e.g., using hydrofluoric acid) and high temperature purification techniques, without sacrificing anode functionality for lithium ion battery applications using the processed materials produced thereby.

In exemplary implementations of the present disclosure, a precursor material for use in a lithium ion battery anode is provided. The precursor material is made from natural graphite, i.e., mined graphite material in its native form. The precursor material is processed so as to retain its metal-based and non-metal-based impurities. In further exemplary embodiments of the present disclosure, the precursor material may be processed so as to contain/retain silicon-based minerals at a level of 0.5 to 2 weight % silicon, while such processing is effective to substantially remove native metal-containing compounds, e.g., compounds that include iron, aluminum, sodium, calcium, manganese, magnesium, vanadium and/or titanium (such as silicates, oxides, clays, sulfides and the like), to levels of less than 0.05 weight %. The silicon-based minerals may be present/retained in the precursor material in various forms, e.g., as silicate(s) and/or silicon carbide-based mineral(s).

The disclosed precursor material may be used to fabricate a lithium ion battery anode material through a direct pyrolyzation, carbonization and/or graphitization process whereby a carbonaceous material coats the graphite precursor particles. The lithium ion battery anode material so fabricated may include/retain native silicon material following post treatment or may be partially or fully purified to specification.

When using natural graphite as a lithium ion battery anode material, the natural graphite is commonly treated to form a carbonized or graphitized carbonaceous coating to achieve better performance properties. The resulting coated natural graphite particles are schematically represented in FIG. 1. In particular, FIG. 1 provides a schematic representation of carbonaceous coated natural graphite particle. A spheroidized natural graphite core (A) is coated with a carbonaceous material and heat treated to carbonization or graphitization temperatures to form a carbonized or graphitized coating (B). In exemplary embodiments of the present disclosure, the inner core (A) is natural graphite and the outer coating (B) is a carbonaceous material. The natural graphite inner core (A) may retain native metal and non-metal impurities or may retain native silicon (at least about 0.5 weight % silicon) while other non-metal and metal impurities are substantially removed. The carbonaceous coating material may be mixed with a $SiO_x$ and/or silicon precursor prior to forming the carbonaceous coating (B).

In exemplary embodiments of the present disclosure, a lithium ion battery anode material fabricated from the disclosed precursor material (i.e., with residual silicon-based minerals) may be coated with a pitch material or a polymer material that is pyrolyzed, carbonized and/or graphitized. Chemical vapor deposition (CVD) methods may also be utilized as is known in the industry. The pitch material used to coat the lithium ion battery anode material may have a softening point at a temperature of about 200° C. to 300° C., but may also have a softening point below 200° C. The polymer material may be, for example, epoxy resin, phenolic resin, polyacrylonitrile, polyvinyl alcohol or polystyrene. Exemplary polymeric coatings are described in CN100420627C to Morgan Hairong, the disclosure of which is incorporated herein by reference. In exemplary embodiments, the pitch may be mixed with a $SiO_x$ and/or Si precursor, thereby introducing further silicon-based material to the lithium ion battery anode.

Thus, the lithium ion battery anode material may be processed by heat treatment at a carbonization temperature, e.g., a temperature between 900° C. and 1900° C., and preferably between 1050° C. and 1400° C.

In addition, the lithium ion battery anode material may be further processed by heat treatment at a graphitization temperature of between 2200° C. and 3000° C., and preferably between 2400° C. and 2900° C.

The disclosed lithium ion battery anode material may be blended with artificial graphite. Blending of the lithium ion battery anode material with artificial graphite is generally undertaken independent of and subsequent to the heat-treatment steps outlined above.

In exemplary embodiments where the lithium ion battery anode is blended with artificial graphite, the proportion of artificial graphite to precursor material generally ranges from 20/80 to 80/20 (artificial graphite/precursor material).

The lithium ion battery anode material of the present disclosure may be blended with $SiO_x$ and/or other silicon-based material(s) at any stage in anode material fabrication to achieve desirable silicon levels in the final anode component.

The disclosed lithium ion battery anode material may be further processed to achieve desired properties. For example, the lithium ion battery anode material may be further processed using spheroidization and milling techniques to enable a material capacity—as measured in mAh/g. In exemplary embodiments, the lithium ion battery anode material is further processed so as to provide a material capacity that is greater than $372 \times (1-((N/100)/0.467))$, where N is the relative percentage amount of silicon in the anode (based on the precursor material). As noted above, the amount of silicon retained in the precursor material may be in the range of 0.5-2 weight % while still achieving effective anode functionality in lithium ion battery applications.

Additional features, functions and benefits of the disclosed methods and materials of the present disclosure will be apparent from the detailed description which follows.

BRIEF DESCRIPTION OF THE FIGURES

To assist those of skill in the art in making and using the disclosed invention, reference is made to the accompanying figures, wherein.

DETAILED DESCRIPTION

As noted above, the present disclosure provides advantageous methods for processing natural graphite that may be employed to produce carbon anodes for Li-ion batteries. The disclosed processing methods are effective in producing graphite that is characterized by improved grade, but may be further characterized by retention of silicon-based impurities, including silicates and other silicon-containing minerals, at levels that exceed silicon impurity levels deemed acceptable in the industry heretofore. The processed graphite materials of the present disclosure may be produced in a more cost effective and environmentally acceptable manner, as compared to prior art processing regimens, while nonetheless providing effective functionality for lithium ion battery applications. Indeed, the disclosed processing methods may employ temperature-based treatment alone, i.e., without acid treatment, in the production of lithium ion battery anodes in a cost effective and environmentally friendly manner. The processed graphite materials generated using the disclosed methods may be blended with artificial graphite and/or particulate silicon and/or $SiO_x$ materials for enhanced properties. The description which follows serves to further illustrate and demonstrate the benefits associated with the disclosed methods and materials.

Figure 1:
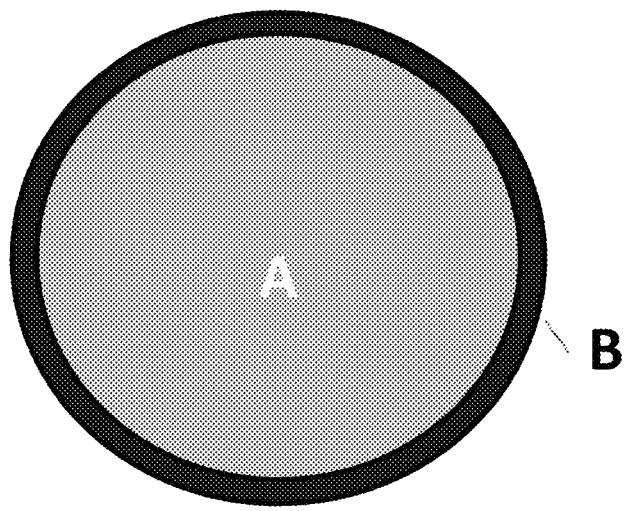
FIG. 1 schematically depicts natural graphite coated with a carbonaceous material.
Figure 2:
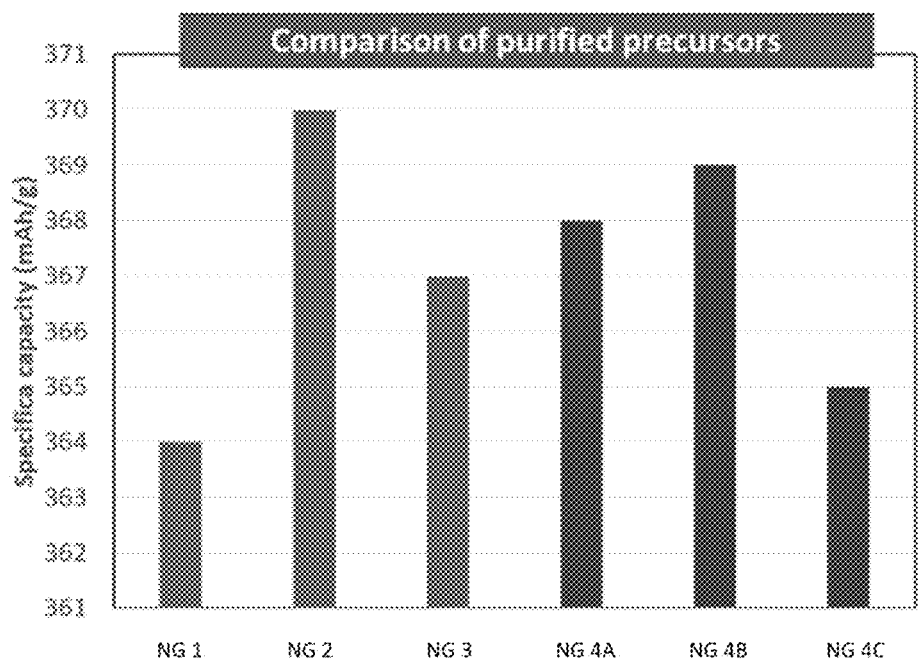
FIG. 2 provides capacity data for purified natural graphite materials.
Figure 3:
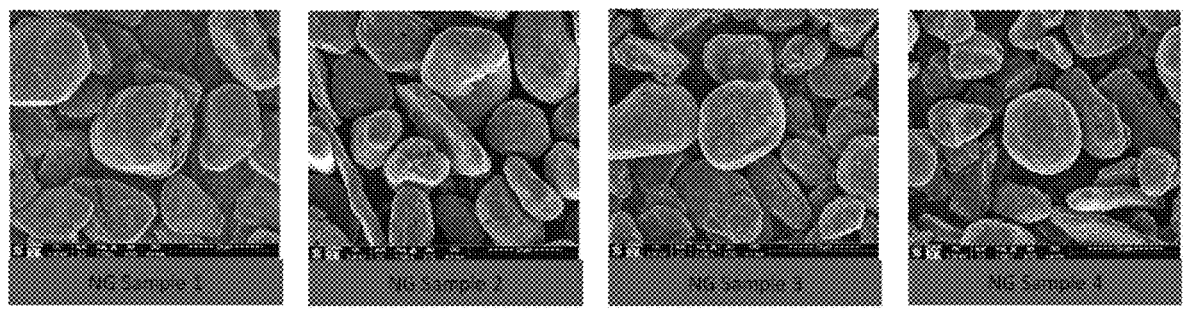
FIG. 3 provides SEM images for purified natural graphite materials.

FIG. 2 shows specific electrical charge capacity data for a number of natural graphite (NG) materials that have been processed through a standard commercial type method to produce a battery anode material, including undergoing a chemical purification process. The physical appearance of these natural graphite materials is demonstrated through SEM analysis and is shown in FIG. 3.

Specific electrical charge capacity represents a critical feature for battery performance and is used to qualify materials that exhibit acceptable performance. For natural graphite battery anode materials, it is expected that the specific electrical charge capacity will be in the range of 350 mAh/g to 370 mAh/g, and preferably >360 mAh/g. This electrical charge capacity measure represents the capability of the natural graphite material to intercalate lithium ions when used as a battery anode material. The graphite material may be modified to improve other required performance features, including first cycle efficiency, power capability, and life capability. These improvements may involve a trade-off relative to the inherent electrical charge capacity of the material.

To make such improvements, for a common type of natural graphite battery anode material, after spheroidization and purification, the spherical or spheroidized natural graphite may be coated with coal tar pitch or petroleum tar pitch or other carbonaceous material and heat treated to form a carbonized surface covering the individual graphite particles. As used herein, the terms "spherical" and "spheroidized" are synonymous and are used interchangeably. The purpose of this coating is to improve performance features of the natural graphite when used as a battery anode material by, inter alia, creating a physical barrier between the spherical graphite particle and the electrolyte fluid inside the finished battery. To balance specific capacity and performance features of the coated particle, the coating should be as thin as practically possible while maintaining a specific surface coverage that is homogeneous within a desired thickness range. In one such process, spherical natural graphite is coated with petroleum tar pitch or coal tar pitch. About 0.5 to 10 weight percent of pitch may be used in such a coating process.

In one such process, the coating may be performed by mechanical mixing and distributing the finely-milled pitch evenly onto the surface of the spherical graphite, such that a homogenous coating is achieved during the heat treatment of the material in a specialized furnace. This pitch-coated graphite is heated to form a carbonized coating, after physically going through pyrolysis and carbonization. Heat treatment may occur in the range of 1050° C. to 1400° C. to form a carbonized coating or may occur in the range of 2200° C. to 3000° C. to both form a carbonized coating and graphitize the carbonized coating so formed. The resulting carbon-coated or graphitized carbon-coated natural graphite materials serve as products used as anode material in lithium-ion batteries.

Examples of conventional processes, as described above, which are typical for the natural graphite Li-ion anode industry are found in patents CN100338802C and CN200410027615X to BTR, U.S. Pat. No. 6,403,259 to Kitagawa et al. (Mitsubishi Electrical Industrial Co. Ltd./Mitsubishi Chemical Corp.), and CN 100420627C to Morgan Hairong.

In one exemplary implementation of the present disclosure, a petroleum tar pitch or coal tar pitch coating, with a softening point in the range of 60° C. to 320° C., preferably 200° C. to 300° C., is combined with the naturally occurring/native graphite material in a mass-equivalent amount of 0.5% to 10.0% pitch to graphite ratio, more preferably 3% to 6%. The pitch coating is further converted into either a carbonized coating by progressive thermal treatment at a maximum temperature not exceeding 1800° C., and more preferably below 1650° C., or, alternatively, into a graphitized coating by high temperature thermal treatment at temperatures of 2200° C. to 3000° C., more preferably 2400° C. to 2900° C.

Multiple experiments have been performed using unpurified and purified graphite materials from the same deposit and processing plant, and those experiments have validated advantageous processing pathways and processed materials having particular utility in the fabrication of anode materials for use in Li-ion batteries. In particular, it has been found that significantly lower cost anode material products may be produced by using low-purity graphite as a precursor to the disclosed heat treatment process compared to conventional graphite materials that meet industry-based purity standards.

In exemplary embodiments, processing of the naturally occurring/native graphite material into a material usable as the anode material for lithium-ion batteries according to the present disclosure comprises a process including (i) a thermal treatment that removes naturally occurring impurities, the noted thermal treatment generally taking place in a temperature range of 1500° C. to 3000° C., or (ii) a chemical purification process using acids, but specifically excluding HF, or (iii) a combination of the noted thermal treatment and chemical purification processes (excluding HF-based chemical purification).

Exemplary Implementation #1

Figure 4A:
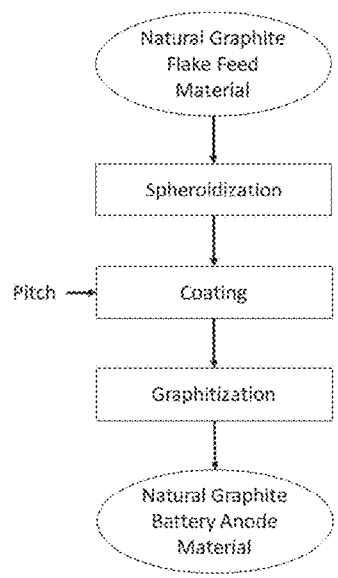
FIG. 4A provides a flow chart for a method that eliminates a chemical purification process step for pitch-coated natural graphite in-situ purification and graphitization according to the present disclosure.

In an exemplary implementation of the present disclosure, an advantageous process of direct graphitization is provided herein as described in FIG. 4A (Process 1). In Process 1, natural flake graphite which has been mined and concentrated through a series of beneficiation stages is dried and classified before transfer to a milling and shaping process. The powder is then coated and subjected to a single heat treatment-purification stage that combines pyrolysis, carbonization and graphitization. To purify the graphite particles and graphitize the coating layer, the coated graphite is subjected to graphitization temperatures, such as between 2200° C. and 3000° C.

According to the present disclosure, it has been determined that through higher temperature thermal processing (i.e., at temperatures greater than 2850° C.), silicon-based impurities and other metal-based impurities may be completely removed from the purified/graphitized material by sublimation without destroying the newly graphitized carbon coating (artificial graphite coating from pitch) on the graphite particles. Of particular note, the resulting carbon coated graphitized spherical graphite material produced high electrical capacity consistent with the natural graphite precursor material.

A comparison between different materials processed with and without initial metal-based impurities in the feed material evidenced similar mechanical and electro-chemical properties. This result demonstrates that pre-purification of uncoated spherical natural graphite or of pitch-coated natural graphite materials may not be required prior to the graphitization treatment of the coating layer for certain graphite applications. The results further demonstrate that pre-carbonization of the pitch coating is not required prior to the graphitization treatment of the coating layer.

An example of an implementation of Process 1 in FIG. 4A according to the present disclosure is described herein below.

Feed raw material is standard grade flake graphite with purity of >95% total carbon (TC) as measured by the loss on ignition (LOI) method. Particle size specification of standard grade flake graphite has greater than 80% by mass passing through a 100-mesh screen and less than 25% by mass passing through a 325-mesh screen using standard laboratory screening methods. A spheroidization process was deployed by a combination of milling, shaping and selective classification of the unpurified flake graphite. In this spheroidization process, the flake is initially milled through one or more air classifier or faculty mills arranged in series to reduce material to an initial target particle size distribution prior to shaping. The sized material is then fed to one or more air classifier or faculty mills arranged in series to shape it into ellipsoidal or spheroidal particles. The material is classified at each stage of milling to remove fine material as by-product. Processing continues until the final target particle size distribution, shape and tapped bulk density are achieved. Such interim product is defined herein as "unpurified uncoated spherical graphite".

A coating process follows, where finely milled pitch solids having a size range of preferably between 2 to 10 microns are combined with unpurified spherical graphite. Other coating methods may also be deployed as commonly used in the industry, including the use of solvents and vapor deposition methods. Mechanical mixing of the two components produces a coating layer of pitch material surrounding and adhesively bonding to the surfaces of the unpurified spherical graphite particles. The pitch used for coating is either coal tar pitch or petroleum tar pitch, or a mix of both, preferably with a softening point in the range of 200° C. to 300° C., although lower softening point pitches (e.g., softening point below 200° C.) may also be used.

The coated unpurified spherical graphite may be treated in a continuous powder-based graphitization process. However, in an exemplary implementation, the coated unpurified spherical graphite is loaded into crucibles or boats for feed to a graphitization furnace. The furnace may be a stationary furnace with a controlled heat up and cool down cycle, or one in which the material is transported or conveyed through various heating and cooling zones to achieve the desired thermal profile in a continuous process. Alternatively, a rotary furnace or other continuous furnace may be used.

With heating of the coated graphite through the temperature range of 300° C. to 600° C. in an inert atmosphere, e.g., argon or nitrogen, organic compounds in the pitch are broken down to release volatile components. With continued heating to temperatures above 1050° C., pitch is completely converted to carbon, thus forming a carbonized coating layer around the spherical graphite particles. Heating continues through to the range of 2400° C. to 2600° C., where the carbonized coating layer and any non-graphitized components in the starting material are progressively converted to graphite-like molecular structures. Further heating beyond 2400° C. to 2600° C. and to temperatures exceeding 2900° C. results in the progressive reduction of the oxide-based metal impurities within the graphite to carbide compounds that are eventually sublimated or vaporized, thus additionally purifying the graphite. The cooled and screened product is then ready for use in lithium-ion battery anodes.

Figure 5:
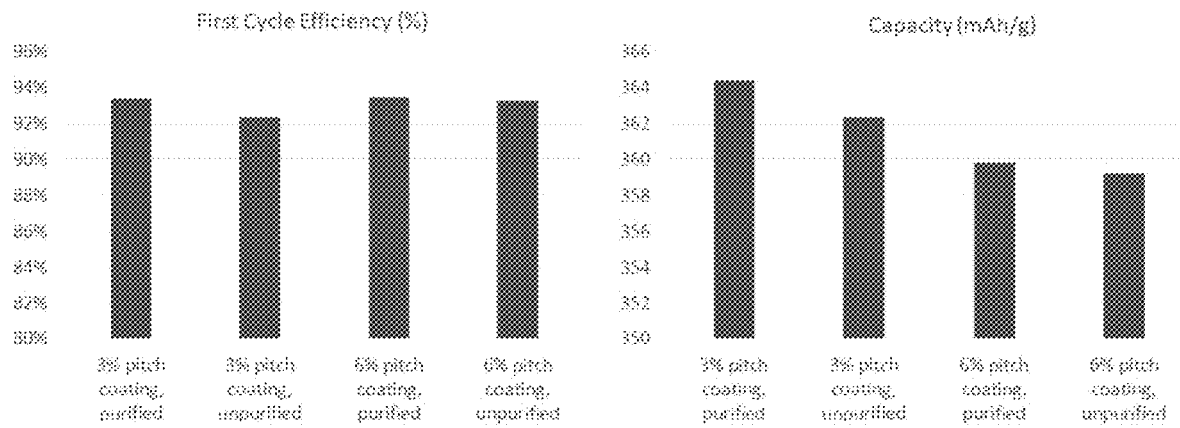
FIG. 5 provides first cycle efficiency (%) and capacity data for post-graphitization materials using chemically purified and unpurified precursors.

FIG. 5 shows the materials and electrochemical properties tested in Process 1 and compares these with materials generated from a purified precursor, i.e., a precursor that is processed so as to satisfy industry requirements relative to impurity levels. Both the unpurified and chemically purified 16 μm spherical natural graphite precursors were coated with 3% and 6% pitch-to-graphite on a weight basis, respectively. The coated samples were graphitized at 2900° C. for four (4) hours in the hot stage. The capacity and coulombic efficiency of the resulting graphitized samples were determined using coin cell testing. The results showed that the unpurified coated samples having gone through a subsequent heat treatment process, perform as well as purified coated samples in the key battery performance metrics of first cycle efficiency (FCE) and capacity.

Figure 4B:
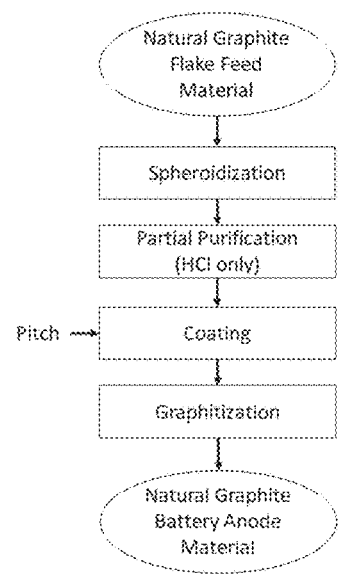
FIG. 4B provides a flow chart for a method that reduces the chemical purification process and eliminates the use of HF acid for pitch-coated natural graphite purification and graphitization according to the present disclosure.
Figure 4C:
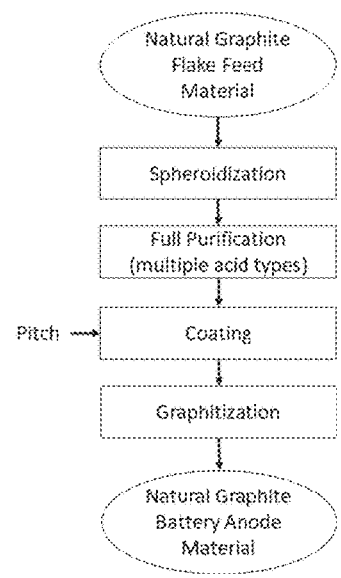
FIG. 4C provides a flow chart for a control/typical method that includes chemical purification.

TABLE 1 (below) shows that the graphite crystalline basal plane layer-to-layer spacing $d_{002}$ and graphitization degree of samples prepared by Process 1 are similar to the results obtained for samples prepared by Process 3 (control) as shown in FIG. 4C, which represents the graphitization of purified coated precursors.

TABLE 1

$d_{002}$ and graphitization degree of samples prepared by Process 1 compared with sample prepared by Process 3 (control)

|  | Unpurified precursor with 3% pitch coating | Unpurified precursor with 6% pitch coating | Purified precursor with 3% pitch coating |
| --- | --- | --- | --- |
| Degree of graphitization (%) | 96.69 | 96.99 | 97.40 |
| $d_{002}$ (Å) | 3.3568 | 3.3566 | 3.3562 |

Based on the foregoing, it is clear that a precursor material processed according to Process 1—which substantially removes metal-based impurities, e.g., compounds that include iron, aluminum, sodium, calcium, manganese, magnesium, vanadium and/or titanium (e.g., to levels of less than 0.05 weight %)—offers substantially equivalent functionality for lithium-ion battery applications. It is clear that Process 1 provides a more cost effective and environmentally acceptable method for making precursor as compared to Process 3 for use in lithium-ion battery applications.

Figure 6:
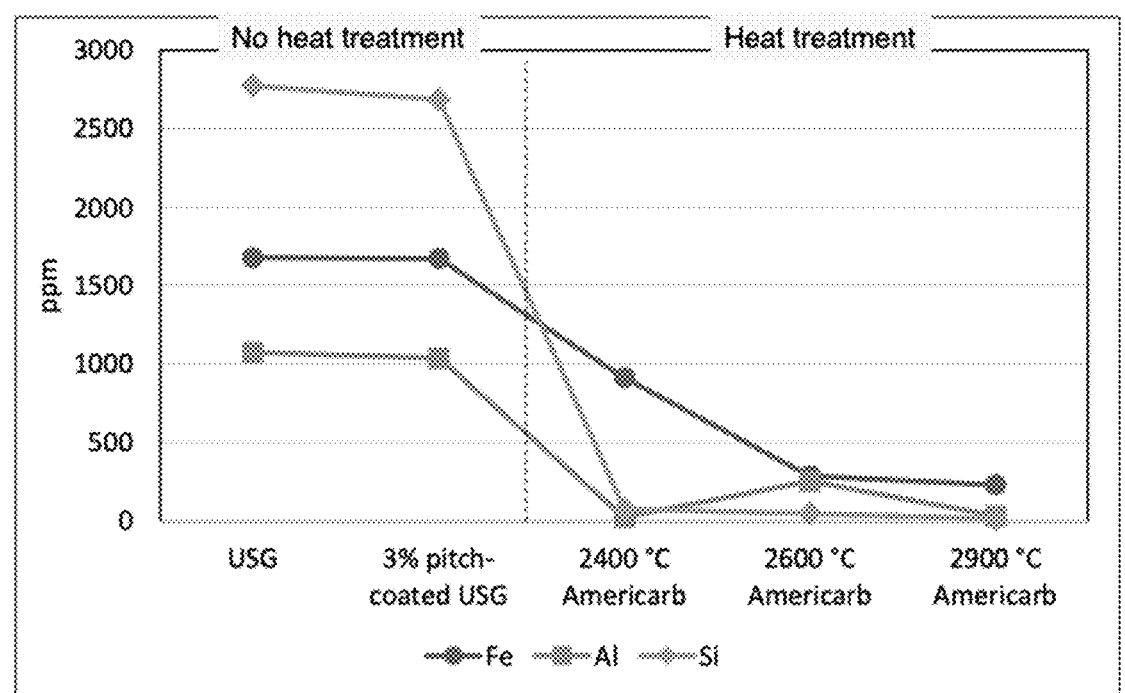
FIG. 6 provides comparison of metal impurity reductions at different treatment temperatures.

Additional tests were conducted according to Process 1 whereby unpurified natural spherical graphite was coated with petroleum tar pitch and thermally treated at three different temperatures of 2400° C., 2600° C. and 2900° C., and the products analyzed by X-ray fluorescence spectroscopy (XRF). FIG. 6 presents a comparison of iron, aluminum and silicon compositions for materials treated at different temperatures against those of the uncoated and coated precursor material. The compositions demonstrate that thermal treatment reduces impurities in all samples and that improved impurity reductions were observed for the higher treatment temperatures of 2600° C. and 2900° C.

Figure 7:
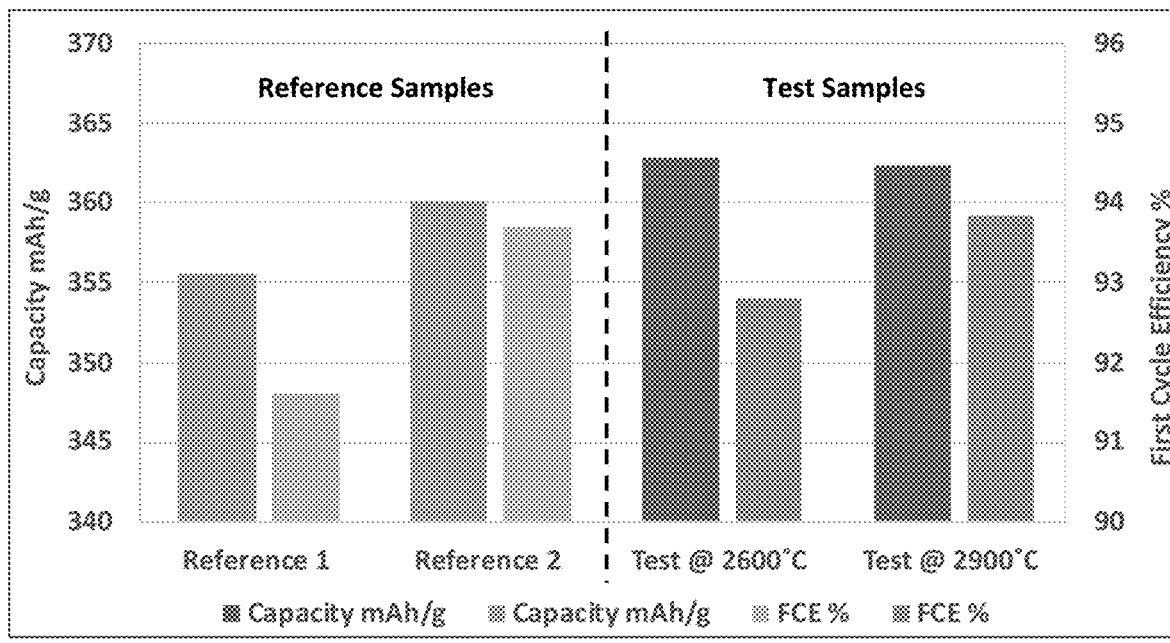
FIG. 7 provides a comparison of electrochemical properties for materials treated at different temperatures.

The materials generated from the 2600° C. and 2900° C. treatments were electrochemically tested to determine charge capacity and first cycle efficiency. FIG. 7 presents a comparison of the electrochemical properties of the materials against two commercially available natural spherical graphite active anode materials. The first comparison material is a chemically purified, pitch coated and carbonized natural spherical graphite. The second comparison material is a pitch coated, carbonized and graphitized natural spherical graphite. The electrochemical properties comparison demonstrates that charge capacity and first cycle efficiency of materials treated according to Process 1 are comparable or superior to commercially available products and that retention of at least some of the aluminum, iron and silicon impurities has minor impact on charge capacity or first cycle efficiency.

Exemplary Implementation #2

In a second exemplary implementation of the present disclosure, a graphite material is used as an anode material in a lithium-ion battery that is made entirely, or partly, from naturally occurring graphite material containing naturally occurring silicon-based impurities, wherein processing of the naturally occurring, i.e., native, graphite material is effective to reduce the silicon content in the graphite material used to fabricate the anode material to a range of 0.5% to 5% (mass-equivalent) elementary silicon.

Of note, processing of the naturally occurring/native graphite to form the desired precursor is selected so as to allow retention of silicon minerals while substantially removing other metal-based and non-metal-based impurities, e.g., compounds that include iron, aluminum, sodium, calcium, manganese, magnesium, vanadium and/or titanium (such as silicates, oxides, clays, sulfides and the like). In particular, metal impurities (other than silicon) are each generally reduced to levels of less than 0.05 weight % (elemental metal basis) according to the present disclosure, while retaining silicon-based minerals within the noted range (i.e., 0.5% to 5% weight % elemental silicon). Materials produced using such cost optimized processing methods were found to have substantially equivalent electrical charge capacity on a relative graphite mass basis, after correction for the silicon-based mineralization present in the precursor.

It is expected that some of the silicon-based contamination of the graphite material that is retained in the precursor according to the present disclosure is rendered chemically and electro-physically inert inside the lithium ion battery when subject to standard battery operation conditions, i.e., operations within conventional state of charge (SOC) ranges and conventional voltage ranges. As long as metal-containing compounds, such as compounds that include iron, manganese and other metal-containing compounds that can be dissolved in the lithium-ion battery application are removed to avoid dendrite formation, a lower cost anode material with similar energy capacity as standard purified materials may be created.

By leaving the silicon-based mineral contamination (at the levels noted herein), but removing transition metals, chemical purification can be significantly scaled back or eliminated, hence creating an alternative low-cost anode material with residual silicon-based contamination that presents acceptable electrochemical properties for lithium-ion battery applications. Thus, the present disclosure identifies a processing modality for precursor generation that is less expensive and more environmentally sound, while generating a precursor that offers equivalent functionality for lithium-ion battery anode applications. The ability to reduce purification of the naturally occurring/native graphite without sacrificing precursor functionality is unexpected and directly contrary to longstanding industry thinking as it relates to requisite purity properties of precursor materials for use in fabricating anodes for lithium-ion batteries.

Table 2 shows the impurity level of unpurified spherical natural graphite materials from various sources measured by XRF method. Source A has a silicate content in a range of 3.15% to 3.75%, Source B has a silicate content in a range of 1.52% to 1.97%, Source C has a silicate content of 1.67%, Source D has a silicate content of 1.56%, Source E has a silicate content of 3.2% and Source F has a silicate content of 1.5%. The silicate content is expressed in both $SiO_2$ equivalent weight percentage, the assumed chemical form of the silicate, and as elemental Si weight percentage. The iron content is expressed in $Fe_2O_3$ equivalent weight percentage for all source samples and is in the range of 0.3% to 0.48%.

TABLE 2

Silicate and iron impurities of spherical natural graphite from various sources

|  | Source A | | | Source B | | Source C | Source D | Source E | Source F |
| --- | --- | --- | --- | --- | --- | --- | --- | --- | --- |
|  | Sample 1 | Sample 2 | Sample 3 | Sample 1 | Sample 2 | Sample 1 | Sample 1 | Sample 1 | Sample 1 |
| $SiO_2$ % | 3.43 | 3.71 | 3.15 | 1.97 | 1.52 | 1.67 | 1.56 | 3.2 | 1.5 |
| Si % | 1.60 | 1.73 | 1.47 | 0.92 | 0.71 | 0.78 | 0.73 | 1.50 | 0.70 |
| Fe(III) oxide % | 0.46 | 0.48 | 0.35 | 0.43 | 0.37 | 0.44 | 0.3 | 0.41 | 0.41 |

Table 3 shows specific capacity data for two spheroidized graphite samples with each sample tested before and after conventional purification. The purified natural graphite—i.e., natural graphite that has been processed according to conventional spheroidization and purification techniques to reduce silicon impurities to below conventional industry standards—demonstrates a measured specific capacity close to the theoretical expectation of natural graphite of 372 mAh/g. For the unpurified/native sample, the presence of impurities (including specifically silicon-based impurities) reduces the specific capacity of the material as there is less active graphite to contribute to the measured specific capacity. However, the material still exhibits capacity in a useful and practical range (typically >330 mAh/g) for application in a lithium ion battery.

TABLE 3

Specific capacity of purified and unpurified spherical natural graphite

| Sample | Source A - Sample 2 purified | Source A - Sample 2 unpurified | Source A - Sample 3 purified | Source A - Sample 3 unpurified |
| --- | --- | --- | --- | --- |
| Silicate % | Negligible | 3.71% | Negligible | 3.15% |
| Elemental Silicon % (assuming $SiO_2$) | n/a | 1.73% | na | 1.47% |
| Theoretical capacity, correcting for silicate impurity (mAh/g) | 372 | 358 | 372 | 360 |

TABLE 3-continued

Specific capacity of purified and unpurified spherical natural graphite

| Sample | Source A - Sample 2 purified | Source A - Sample 2 unpurified | Source A - Sample 3 purified | Source A - Sample 3 unpurified |
| --- | --- | --- | --- | --- |
| Measured Specific capacity (mAh/g) | 369.0 | 351.6 | 365.4 | 340.6 |

According to the present disclosure, a processing regimen, whereby silicon-containing minerals are retained through the purification process, reduces processing cost and eliminates the need for the use of HF in an acid wash process, thereby also reducing the environmental impact of the purification process. This fundamental modification to the processing regimen enables a lower cost option and offers an approach that is particularly well suited for lithium ion battery applications where there is high cost sensitivity.

According to the present disclosure, it is contemplated that physical processing techniques combined with high temperature treatment can be used to deliver natural graphite containing silicon-based impurities, which displays higher than expected specific electrical capacity. It is known that high temperature treatment will remove impurities, with silicon-based impurities generally requiring the highest temperature to sublime. Typically, silicon-based impurities are first converted to silicon carbide (SiC). Somewhat different from silicates (e.g., $SiO_2$), silicon carbide incorporates into the graphite structure and can block electrochemical intercalation (charging) or deintercalation (discharging). Thus, the presence of silicon carbide can lower capacity of a lithium ion battery.

According to the present disclosure, using physical powder processing techniques, including spheroidization and particle sizing, the natural graphite particle structure is modified into a size and shape suitable for application as a lithium ion battery anode material. This physical powder processing generally modifies the surface characteristics of the graphite and could overcome the blocking function of SiC, thereby enabling a higher than expected capacity. Of note, a processing regimen that relies on physical processing, but does not involve high cost/environmentally unfriendly processing steps aimed at removing silicon-based impurities, offers a reduced processing cost based at least in part on the elimination of processing operations aimed at reducing/eliminating silicon levels so as to meet industry standards for silicon levels for lithium ion battery applications.

Typically, the expected capacity for natural graphite would be 372 mAh/g, assuming 100% graphite. Impurities (such as silicon in the form of silicates) are inactive and lower the capacity of the lithium ion battery proportional to their mass %. Since the majority of silicon-based impurities are expected to be in the form of silicates (with a chemical structure of $SiO_2$), the expected capacity can be calculated knowing the level of silicon impurity by the following formula:

$$\text{Capacity (mAh/g)} = 372 \times (1-((N/100)/0.467)) \tag{1}$$

where N is the weight % of Si and 0.467 is the mass fraction of Si in $SiO_2$.

It would be unexpected to generate a higher capacity in a lithium ion battery than is predicted by Formula (1) and such unexpected result would indicate that the processing technique(s) had modified the form of the silicon impurity such that it contributed less to deactivating the capacity of the battery than predicted by Formula (1).

According to the present disclosure, a further advantageous processing regimen is provided for manufacture of precursor having particular utility in lithium-ion battery applications. In particular, Process 2 shown in FIG. 4B utilizes the same feed material as used in Process 1 (described above) and includes a hydrochloric acid (HCl) purification step prior to the pitch coating step. Optionally, the last heat treatment step may also operate at a lower top-end temperature, such as 1700° C. or as low as 1200° C. The chemical HCl purification removes many of the metallic impurities and, most importantly iron, with limited dilution of silicon-based impurities.

Unpurified spherical graphite is mixed with partially spent or fresh dilute acid solution containing hydrochloric acid. The slurry is heated to a temperature typically not exceeding 60° C. to 80° C. and continuously mixed for a prolonged time, typically 8 to 12 hours. Solids are separated from the acid mixture through a filter. The filtered solids may be further processed through subsequent dilute batches of spent or fresh acid solution to improve purity.

A coating process is then employed that combines finely milled pitch solids having a size range of 2 to 10 microns with the partially purified spherical graphite and mixes the two components to effect coating of the spherical graphite particles with pitch. Other coating methods may also be deployed as commonly used in the industry, including the use of solvents and vapor deposition methods. The pitch used for coating is typically either coal tar pitch or petroleum tar pitch, with softening point preferably in the range of 200° C. to 300° C., although pitch materials with lower softening points may be used. Also, a mix of lower softening point pitch and higher softening point pitch may be used.

The coated spherical graphite is loaded into crucibles or boats for feed to a graphitization furnace. As noted above, continuous power-based graphitization processes may also be employed. The graphitization furnace may be a stationary furnace with a controlled heat up and cool down cycle, or one in which the material is transported or conveyed through various heating and cooling zones to achieve the desired thermal profile. Alternatively, a rotary furnace or other continuous furnace may be used. Initial heating of the coated and partially purified spherical graphite goes through the temperature range of 300° C. to 600° C., where organic compounds in the pitch are broken down by means of pyrolysis and volatile components are released. Continued heating to 1200° C. is then deployed, where pitch is completely reduced to carbon, thus forming a carbonized coating around the spherical graphite particles. This product may optionally be used as a final product, referred to as "Process 2a Product". The powder may then be further heat treated through the range of ideally about 2200° C. to 3000° C., to progressively convert the carbonized coating and any non-graphitized carbon components in the starting material to graphite, and to reduce residual impurities to desired levels if required. This product may also be used as a final product, referred to as "Process 2b Product".

The products from Process 1 (FIG. 4A), Process 2a (FIG. 4B), and Process 2b (FIG. 4B) may be mixed with artificial graphite powder characterized by a similar size regime. Also, artificial graphite with smaller particulate sizes may be used. Such artificial graphite powders are well known in the industry and are generally produced from pitch precursors. Artificial graphite typically has lower capacity than natural graphite but offers the advantage of better cycle life. Natural graphite has the advantages of generally higher capacity and lower cost. Such innovative materials as produced by Process 1, Process 2a, and Process 2b, and blends of these products with artificial graphite, therefore, have the advantages of low cost, high capacity and long cycle life when used in batteries.

Exemplary Implementation #3

In yet another mixed product, active silicon is further mixed into the product to enhance capacity. Such silicon can be pure fine silicon particulate powders or $SiO_x$ compounds, as described in the patent literature (see, e.g., JP2005149946, CN102394287B, U.S. Pat. No. 5,624,606, and JP2000-203818A). The silicon may be added at levels of about 1 to about 15 weight % relative to the graphite, and such silicon addition may be in the range of about 5 to 10 weight % of added silicon-to-graphite. All products as described for Process 1, Process 2a, and Process 2b, or combinations of these and artificial graphite, may be used in combination with the Si or $SiO_x$ powders. Exemplary silicon for addition to the graphite as described herein includes the silicon materials described in U.S. Pat. No. 9,614,216 (Hitachi Chemical) and CN 103022435 (Shanshan Technology).

Further, when mixing in the $SiO_x$ or silicon, such powders may be mixed with the pitch during the pitch coating process, so that silicon remains in the pitch coated region of the natural graphite powders when produced according to Process 1, Process 2a, and Process 2b.

Such silicon and $SiO_x$ mixtures may be used to increase capacity of the anode material above the 372 mAh/g theoretical capacity of pure graphite material. For precursor materials having inactive silicon, the total silicon is then higher than pure material mixed with silicon only.

Figure 8:
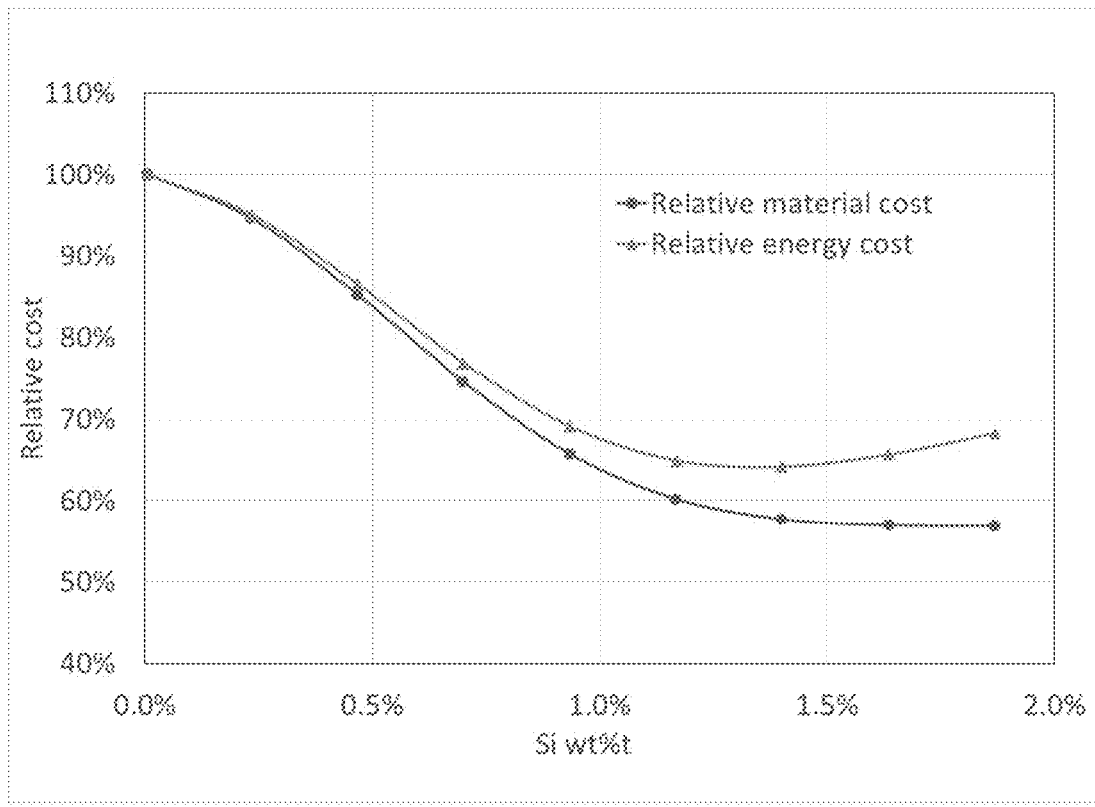
FIG. 8 provides relative anode material cost on a weight and energy basis as a function of residual $SiO_2$ content.

FIG. 8 shows the relative cost vs. % $SiO_2$ content of a pitch coated carbonized spherical natural graphite. A theoretical calculation of the effect of residual silicate amount on the cost of carbon coated anode material is set forth herein. Key parameters that impact treatment costs according to conventional graphite processing regimens are: (i) reagent cost (e.g., HF), (ii) labor cost, and (iii) energy cost. According to the present disclosure, reagent costs and those of the chemical treatment process are substantially reduced or eliminated entirely, thereby significantly reducing the overall cost of graphite processing for lithium ion battery applications, while still delivering effective/acceptable charge capacity performance.

For purposes of a cost/performance analysis, the specific capacity of carbon coated purified natural graphite is 370 mAh/g. By fixing the chemical purification cost for spherical graphite precursor the material cost and energy cost for the anode materials made of various content of residual silicate in the precursor were calculated. FIG. 8 shows the relative material and energy costs versus residual silicate amount that is expressed as Si weight content in a pitch coated carbonized spherical natural graphite, where the material cost ($/kg) and energy cost ($/Wh) of the anode material made of chemically purified precursor is used as 100% basis. Generally, the higher the residual silicate amount, the lower the material and energy costs. However, when the residual Si content is higher than 1.3 wt %, the cost reduction benefit diminishes and a negative impact on cost per energy begins due to the inactive mass of material represented by the Si material. Therefore, an optimum Si content range is identified for benefit of cost per unit energy while also taking advantage of a reduced cost per unit weight compared to full removal of Si impurities.

Although the present disclosure has been described with reference to exemplary embodiments/implementations, the present disclosure is not limited by or to such exemplary descriptions.

The invention claimed is:

1. A method for heat treatment of a coated graphite material, comprising
   a. combining a natural graphite material including silicon-based impurities with a carbonaceous material, and
   b. subjecting the natural graphite material and carbonaceous material combination to a first temperature treatment step in a range between 900° C. and 1900° C. to effect carbonization of the carbonaceous material, and a second temperature treatment step in a range between 2200° C. and 3000° C. to increase graphite purity and effect graphitization of the carbonaceous material, wherein the silicon-based impurities are retained at a level of at least 0.5 weight % of silicon relative to the weight of the treated natural graphite material, thereby producing a temperature-treated coated graphite that is effective for use as a lithium ion battery anode material.

2. The method according to claim 1, wherein the carbonaceous material comprises at least one of petroleum tar pitch, coal tar pitch, a polymeric material, a hydrocarbon liquid and a hydrocarbon gas.

3. The method according to claim 2, wherein the carbonaceous material is a polymer material selected from the group consisting of an epoxy resin, a phenolic resin, polyacrylonitrile, polyvinyl alcohol and polystyrene.

4. The method according to claim 1, wherein the second temperature treatment step results in direct graphitization of the carbonaceous material.

5. The method according to claim 1, further comprising blending the temperature-treated coated graphite after the second temperature treatment step with at least one of artificial graphite, SiO, $SiO_2$, or a silicon precursor.

6. The method according to claim 1, wherein the natural graphite material is not subjected to an acid treatment step.

7. The method according to claim 1, wherein the natural graphite material is subjected to an acid treatment step, but wherein such acid treatment step does not include treatment with HF.

8. A coated graphite material produced according to the method of claim 1.

9. A lithium ion battery anode fabricated, at least in part, from the coated graphite material produced according to the method of claim 8.

* * * * *